United States Patent [19]
Fischer

[11] Patent Number: 5,590,682
[45] Date of Patent: Jan. 7, 1997

[54] WATER FAUCET ROTATION PREVENTION DEVICE

[76] Inventor: Christopher D. Fischer, 16516 Highway 62, Charlestown, Ind. 47111

[21] Appl. No.: 623,909

[22] Filed: Mar. 28, 1996

[51] Int. Cl.$^6$ .............................. F16K 35/10; F16K 35/14
[52] U.S. Cl. .............................. 137/382; 70/178; 70/180; 70/212; 137/385; 251/90
[58] Field of Search .......................... 70/160, 164, 177, 70/178, 179, 180, 212; 137/382, 385; 251/90

[56] References Cited

U.S. PATENT DOCUMENTS

| | | | |
|---|---|---|---|
| 89,930 | 5/1869 | Hall | 137/382 |
| D. 258,905 | 4/1981 | Fialkowski | D23/19 |
| D. 317,497 | 6/1991 | Mast, Jr. | D23/249 |
| 991,216 | 5/1911 | Lawrence | 137/382 |
| 1,084,996 | 1/1914 | Wright | 137/382 |
| 1,620,051 | 3/1927 | Zito | 70/178 |
| 1,817,802 | 8/1931 | Cooper | 70/178 |
| 3,199,121 | 8/1965 | Greto | 137/382 |
| 4,516,414 | 5/1985 | Woolvin | 137/385 |
| 4,570,470 | 2/1986 | Gray, Sr. | 70/212 |
| 4,774,978 | 10/1988 | Lepine, Jr. et al. | 137/334 |
| 4,803,858 | 2/1989 | Parker | 70/178 |
| 5,033,280 | 7/1991 | Johnson | 70/178 |
| 5,092,359 | 3/1992 | Wirth et al. | 137/382 |
| 5,217,201 | 6/1993 | Self | 251/90 |
| 5,263,853 | 11/1993 | Pall | 137/382 |

*Primary Examiner*—George L. Walton
*Attorney, Agent, or Firm*—Richard L. Miller, P.E.

[57] ABSTRACT

A water faucet rotation prevention device that prevents injury to children and the like by preventing the inadvertent and unwanted rotation and opening of bathtub water faucet valves. The water faucet rotation prevention device includes an upper portion, a lower portion, pivoting apparatus, and maintaining apparatus. The upper portion removably receives a part of a pair of spaced apart water faucets. The lower portion is pivotally mounted to the upper portion and removably receives a remaining part of the pair of spaced apart water faucets. When the water faucet rotation prevention device is in the open position the pair of spaced apart water faucets are accessible for rotation and when the water faucet rotation prevention device is in the closed position the pair of spaced apart water faucets are unaccessible for rotation. The pivoting apparatus pivotally mounts the upper portion to the lower portion. And, the maintaining apparatus maintains the water faucet rotation prevention device in the closed position, so that the pair of spaced apart water faucets are maintained unaccessible for rotation.

20 Claims, 2 Drawing Sheets

WATER FAUCET ROTATION PREVENTION DEVICE

BACKGROUND OF THE INVENTION

The present invention relates to a water faucet rotation prevention device. More particularly, the present invention relates to a water faucet rotation prevention device that includes a lower extendable portion having a first faucet lower receiving end and a second faucet lower receiving end, and an upper extendable portion having a first faucet upper receiving end hingingly connected to the first faucet lower receiving end and a second faucet upper receiving end lockable to the second faucet lower receiving.

Children and the like are subject to injury by the inadvertent rotation and opening of a hot water valve directing hot water flow therethrough to effect scalding and other such injury resultant from skin contact relative to a hot water exposure.

Numerous innovations for valve protectors have been provided in the prior art that will be described. However, even though these innovations may be suitable for the specific individual purposes to which they address, they differ from the present invention in that they do not teach a water faucet rotation prevention device that includes a lower extendable portion having a first faucet lower receiving end and a second faucet lower receiving end, and an upper extendable portion having a first faucet upper receiving end hingingly connected to the first faucet lower receiving end and a second faucet upper receiving end lockable to the second faucet lower receiving.

FOR EXAMPLE, U.S. Pat. No. Des. 258,905 to Fialkowksi teaches a valve cover that includes a hollow enclosure for covering a valve.

ANOTHER EXAMPLE, U.S. Pat. No. Des. 317,497 to Mast, Jr. teaches a faucet protector for toddlers that includes a hollow parallelepiped-shaped housing having a first end opening for receiving a first faucet valve, a central opening for receiving a faucet spout, and a second end opening for receiving a second faucet valve, and a substantially U-shaped member for simultaneously securing the first faucet valve in the first end opening, the faucet spout in the central opening, and the second faucet valve in the second end opening.

STILL ANOTHER EXAMPLE, U.S. Pat. No. 4,774,978 to Lepine, Jr. et al. teaches a safety mechanism for a plumbing fixture supplying hot and cold water through a common line. A mechanical linkage is disposed between the hot water valve and an auxiliary cold water valve to bleed hot water out therefrom. A microprocessor is activated the cold water valve when the hot water valve is closed.

YET ANOTHER EXAMPLE, U.S. Pat. No. 5,217,201 to Self teaches an apparatus for receiving a valve stem through a central support tube. The central support tube has a housing extending upwardly relative to a rear distal end of the support tube.

FINALLY, STILL YET ANOTHER EXAMPLE, U.S. Pat. No. 5,263,853 to Pall teaches a safety device for a shower valve that includes a faucet escutcheon plate having a perimeter with a catch, and a central opening, a bowl-shaped cover having a perimeter with a latch for engaging the catch of the perimeter of the escutcheon plate and being hingingly attached to the perimeter of the faucet escutcheon plate.

It is apparent that numerous innovations for valve protectors have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

ACCORDINGLY, AN OBJECT of the present invention is to provide a water faucet rotation prevention device that avoids the disadvantages of the prior art.

ANOTHER OBJECT of the present invention is to provide a water faucet rotation prevention device that is simple and inexpensive to manufacture.

STILL ANOTHER OBJECT of the present invention is to provide a water faucet rotation prevention device that is simple to use.

BRIEFLY STATED, YET ANOTHER OBJECT of the present invention is to provide a water faucet rotation prevention device that includes an upper portion, a lower portion, pivoting apparatus, and maintaining apparatus.

STILL YET ANOTHER OBJECT of the present invention is to provide a water faucet rotation prevention device wherein the upper portion removably receives a part of a pair of spaced apart water faucets.

YET STILL ANOTHER OBJECT of the present invention is to provide a water faucet rotation prevention device wherein the lower portion is pivotally mounted to the upper portion and removably receives a remaining part of the pair of spaced apart water faucets.

STILL YET ANOTHER OBJECT of the present invention is to provide a water faucet rotation prevention device wherein when the water faucet rotation prevention device is in the open position the pair of spaced apart water faucets are accessible for rotation and when the water faucet rotation prevention device is in the closed position the pair of spaced apart water faucets are unaccessible for rotation.

YET STILL ANOTHER OBJECT of the present invention is to provide a water faucet rotation prevention device wherein the pivoting apparatus pivotally mounts the upper portion to the lower portion.

STILL YET ANOTHER OBJECT of the present invention is to provide a water faucet rotation prevention device wherein the maintaining apparatus maintains the water faucet rotation prevention device in the closed position, so that the pair of spaced apart water faucets are maintained unaccessible for rotation.

YET STILL ANOTHER OBJECT of the present invention is to provide a water faucet rotation prevention device wherein the upper portion includes a first upper hollow, open base, hemispherical-shaped member that has an interior surface, an open base, a front semi-circular-shaped throughbore that opens into the open base of the first upper hollow, open base, hemispherical-shaped member of the upper portion and has a radius of curvature, and a rear semi-circular-shaped throughbore that is in opposing alignment to the front semi-circular-shaped throughbore of the first upper hollow, open base, hemispherical-shaped member of the upper portion and opens into the open base of the first upper hollow, open base, hemispherical-shaped member of the upper portion and has a radius of curvature.

STILL YET ANOTHER OBJECT of the present invention is to provide a water faucet rotation prevention device wherein the radius of curvature of the rear semi-circular-shaped throughbore of the first upper hollow, open base, hemispherical-shaped member of the upper portion is less than the radius of curvature of the front semi-circular-shaped throughbore of the first upper hollow, open base, hemispherical-shaped member of the upper portion.

YET STILL ANOTHER OBJECT of the present invention is to provide a water faucet rotation prevention device wherein the first upper hollow, open base, hemispherical-shaped member of the upper portion further has an interior sponge covers the interior surface of the first upper hollow, open base, hemispherical-shaped member of the upper portion.

STILL YET ANOTHER OBJECT of the present invention is to provide a water faucet rotation prevention device wherein the interior sponge of the first upper hollow, open base, hemispherical-shaped member of the upper portion has a plurality of pointed spongy protrusions that extend therefrom.

YET STILL ANOTHER OBJECT of the present invention is to provide a water faucet rotation prevention device wherein the upper portion further includes a second upper hollow, open base, hemispherical-shaped member that is displaced a distance from the first upper hollow, open base, hemispherical-shaped member of the upper portion and has an interior surface, an open base, a front semi-circular-shaped throughbore that opens into the open base of the second upper hollow, open base, hemispherical-shaped member of the upper portion and has a radius of curvature, and a rear semi-circular-shaped throughbore that is in opposing alignment to the front semi-circular-shaped throughbore of the second upper hollow, open base, hemispherical-shaped member of the upper portion and opens into the open base of the second upper hollow, open base, hemispherical-shaped member of the upper portion and has a radius of curvature.

STILL YET ANOTHER OBJECT of the present invention is to provide a water faucet rotation prevention device wherein the radius of curvature of the front semi-circular-shaped throughbore of the second upper hollow, open base, hemispherical-shaped member of the upper portion is equal to the radius of curvature of the front semi-circular-shaped throughbore of the first upper hollow, open base, hemispherical-shaped member of the upper portion.

YET STILL ANOTHER OBJECT of the present invention is to provide a water faucet rotation prevention device wherein the radius of curvature of the rear semi-circular-shaped throughbore of the second upper hollow, open base, hemispherical-shaped member of the upper portion is less than the radius of curvature of the front semi-circular-shaped throughbore of the second upper hollow, open base, hemispherical-shaped member of the upper portion and equal to the radius of curvature of the rear semi-circular-shaped throughbore of the first upper hollow, open base, hemispherical-shaped member of the upper portion.

STILL YET ANOTHER OBJECT of the present invention is to provide a water faucet rotation prevention device wherein the second upper hollow, open base, hemispherical-shaped member of the upper portion further has a latch prong that extends downwardly from a part of the open base of the second upper hollow, open base, hemispherical-shaped member of the upper portion that faces the first upper hollow, open base, hemispherical-shaped member of the upper portion and is disposed intermediate the front semi-circular-shaped throughbore of the second upper hollow, open base, hemispherical-shaped member of the upper portion and the rear semi-circular-shaped throughbore of the second upper hollow, open base, hemispherical-shaped member of the upper portion.

YET STILL ANOTHER OBJECT of the present invention is to provide a water faucet rotation prevention device wherein the second upper hollow, open base, hemispherical-shaped member of the upper portion further has a lock ring that extends outwardly from a part of the open base of the second upper hollow, open base, hemispherical-shaped member of the upper portion that is opposite to the part of the open base of the second upper hollow, open base, hemispherical-shaped member of the upper portion on which the latch prong of the open base of the second upper hollow, open base, hemispherical-shaped member of the upper portion is disposed.

STILL YET ANOTHER OBJECT of the present invention is to provide a water faucet rotation prevention device wherein the second upper hollow, open base, hemispherical-shaped member of the upper portion further has an interior sponge that covers the interior surface of the second upper hollow, open base, hemispherical-shaped member of the upper portion.

YET STILL ANOTHER OBJECT of the present invention is to provide a water faucet rotation prevention device wherein the interior sponge of the second upper hollow, open base, hemispherical-shaped member of the upper portion has a plurality of pointed spongy protrusions that extend therefrom.

STILL YET ANOTHER OBJECT of the present invention is to provide a water faucet rotation prevention device wherein the upper portion further includes an upper telescopic, cylindrically-shaped, slender connecting assembly that has a hollow sleeve that extends outwardly from the first upper hollow, open base, hemispherical-shaped member of the upper portion, and a rod that extends outwardly from the second upper hollow, open base, hemispherical-shaped member of the upper portion and which is telescopically received by the hollow sleeve of the upper telescopic, cylindrically-shaped, slender connecting assembly of the upper portion, so that the second upper hollow, open base, hemispherical-shaped member of the upper portion and the first upper hollow, open base, hemispherical-shaped member of the upper portion are extendably connected to each other to be simultaneously extended to the proper distances between the spaced apart water faucets.

YET STILL ANOTHER OBJECT of the present invention is to provide a water faucet rotation prevention device wherein the lower portion includes a first lower hollow, open base, hemispherical-shaped member that has an interior surface, an open base, a front semi-circular-shaped throughbore that opens into the open base of the first lower hollow, open base, hemispherical-shaped member of the lower portion and has a radius of curvature, and a rear semi-circular-shaped throughbore that is in opposing alignment to the front semi-circular-shaped throughbore of the first lower hollow, open base, hemispherical-shaped member of the lower portion and has a radius of curvature.

STILL YET ANOTHER OBJECT of the present invention is to provide a water faucet rotation prevention device wherein the radius of curvature of the front semi-circular-shaped throughbore of the first lower hollow, open base, hemispherical-shaped member of the lower portion is equal to the radius of curvature of the front semi-circular-shaped throughbore of the first upper hollow, open base, hemispherical-shaped member of the upper portion.

YET STILL ANOTHER OBJECT of the present invention is to provide a water faucet rotation prevention device wherein the radius of curvature of the rear semi-circular-shaped throughbore of the first lower hollow, open base, hemispherical-shaped member of the lower portion is less than the radius of curvature of the front semi-circular-shaped throughbore of the first lower hollow, open base, hemispherical-shaped member of the lower portion and is equal to the radius of curvature of the rear semi-circular-shaped throughbore of the first upper hollow, open base, hemispherical-shaped member of the upper portion.

STILL YET ANOTHER OBJECT of the present invention is to provide a water faucet rotation prevention device wherein the first lower hollow, open base, hemispherical-shaped member of the lower portion further has an interior sponge that covers the interior surface of the first lower hollow, open base, hemispherical-shaped member of the lower portion.

YET STILL ANOTHER OBJECT of the present invention is to provide a water faucet rotation prevention device wherein the interior sponge of the first lower hollow, open base, hemispherical-shaped member of the lower portion has a plurality of pointed spongy protrusions that extend therefrom.

STILL YET ANOTHER OBJECT of the present invention is to provide a water faucet rotation prevention device wherein the pivoting apparatus includes a hinge that hingingly connects the first lower hollow, open base, hemispherical-shaped member of the lower portion to the first upper hollow, open base, hemispherical-shaped member of the upper portion with the open base of the first lower hollow, open base, hemispherical-shaped member of the lower portion facing the open base of the first upper hollow, open base, hemispherical-shaped member of the upper portion.

YET STILL ANOTHER OBJECT of the present invention is to provide a water faucet rotation prevention device wherein the hinge hingingly connects an outermost part of the open base of the first upper hollow, open base, hemispherical-shaped member of the upper portion, intermediate the front semi-circular-shaped throughbore of the first upper hollow, open base, hemispherical-shaped member of the upper portion and the rear semi-circular-shaped throughbore of the first upper hollow, open base, hemispherical-shaped member of the upper portion, to an outermost part of the open base of the first lower hollow, open base, hemispherical-shaped member of the lower portion, intermediate the front semi-circular-shaped throughbore of the first lower hollow, open base, hemispherical-shaped member of the lower portion and the rear semi-circular-shaped throughbore of the first lower hollow, open base, hemispherical-shaped member of the lower portion.

STILL YET ANOTHER OBJECT of the present invention is to provide a water faucet rotation prevention device wherein the lower portion further includes a second lower hollow, open base, hemispherical-shaped member that is displaced a distance from the first lower hollow, open base, hemispherical-shaped member of the lower portion and has an interior surface, an open base that faces the open base of the second upper hollow, open base, hemispherical-shaped member of the upper portion, a front semi-circular-shaped throughbore that opens into the open base of the second lower hollow, open base, hemispherical-shaped member of the lower portion and has a radius of curvature, and a rear semi-circular-shaped throughbore that is in opposing alignment to the front semi-circular-shaped throughbore of the second lower hollow, open base, hemispherical-shaped member of the lower portion and opens into the open base of the second lower hollow, open base, hemispherical-shaped member of the lower portion and has a radius of curvature.

YET STILL ANOTHER OBJECT of the present invention is to provide a water faucet rotation prevention device wherein the radius of curvature of the front semi-circular-shaped throughbore of the second lower hollow, open base, hemispherical-shaped member of the lower portion is equal to the radius of curvature of the front semi-circular-shaped throughbore of the second upper hollow, open base, hemispherical-shaped member of the upper portion.

STILL YET ANOTHER OBJECT of the present invention is to provide a water faucet rotation prevention device wherein the radius of curvature of the rear semi-circular-shaped throughbore of the second lower hollow, open base, hemispherical-shaped member of the lower portion is less than the radius of curvature of the front semi-circular-shaped throughbore of the second lower hollow, open base, hemispherical-shaped member of the lower portion and equal to the radius of curvature of the rear semi-circular-shaped throughbore of the second upper hollow, open base, hemispherical-shaped member of the upper portion.

YET STILL ANOTHER OBJECT of the present invention is to provide a water faucet rotation prevention device wherein the second lower hollow, open base, hemispherical-shaped member of the lower portion further has an interior sponge that covers the interior surface of the second lower hollow, open base, hemispherical-shaped member of the lower portion.

STILL YET ANOTHER OBJECT of the present invention is to provide a water faucet rotation prevention device wherein the interior sponge of the second lower hollow, open base, hemispherical-shaped member of the lower portion has a plurality of pointed spongy protrusions that extend therefrom.

YET STILL ANOTHER OBJECT of the present invention is to provide a water faucet rotation prevention device wherein the second lower hollow, open base, hemispherical-shaped member of the lower portion further has a catch ring that extends outwardly from a part of the open base of the second lower hollow, open base, hemispherical-shaped member of the lower portion that faces the first lower hollow, open base, hemispherical-shaped member of the lower portion.

STILL YET ANOTHER OBJECT of the present invention is to provide a water faucet rotation prevention device wherein the catch ring of the open base of the second lower hollow, open base, hemispherical-shaped member of the lower portion is disposed intermediate the front semi-circular-shaped throughbore of the second lower hollow, open base, hemispherical-shaped member of the lower portion and the rear semi-circular-shaped throughbore of the second lower hollow, open base, hemispherical-shaped member of the lower portion and is in alignment with the latch prong of the open base of the second upper hollow, open base, hemispherical-shaped member of the upper portion.

YET STILL ANOTHER OBJECT of the present invention is to provide a water faucet rotation prevention device wherein the second lower hollow, open base, hemispherical-shaped member of the lower portion further has a lock ring that extends outwardly from a part of the open base of the second lower hollow, open base, hemispherical-shaped member of the lower portion that is opposite to the part of the open base of the second lower hollow, open base, hemispherical-shaped member of the lower portion on which the catch ring of the open base of the second lower hollow, open base, hemispherical-shaped member of the lower portion is disposed.

STILL YET ANOTHER OBJECT of the present invention is to provide a water faucet rotation prevention device wherein the lock ring of the open base of the second lower hollow, open base, hemispherical-shaped member of the lower portion is disposed intermediate the front semi-circular-shaped throughbore of the second lower hollow, open base, hemispherical-shaped member of the lower portion and the rear semi-circular-shaped throughbore of the second lower hollow, open base, hemispherical-shaped member of the lower portion and is in alignment with the lock ring of the open base of the second upper hollow, open base, hemispherical-shaped member of the upper portion.

YET STILL ANOTHER OBJECT of the present invention is to provide a water faucet rotation prevention device wherein the lower portion further includes a lower telescopic, cylindrically-shaped, slender connecting assembly that is displaced a distance below the upper telescopic, cylindrically-shaped, slender connecting assembly.

STILL YET ANOTHER OBJECT of the present invention is to provide a water faucet rotation prevention device wherein the lower telescopic, cylindrically-shaped, slender connecting assembly has a hollow sleeve that extends outwardly from the second lower hollow, open base, hemispherical-shaped member of the lower portion, and a rod that extends outwardly from the first lower hollow, open base, hemispherical-shaped member of the lower portion and which is telescopically received by the hollow sleeve of the lower telescopic, cylindrically-shaped, slender connecting assembly of the lower portion, so that the first lower hollow, open base, hemispherical-shaped member of the lower portion and the second lower hollow, open base, hemispherical-shaped member of the lower portion are extendably connected to each other to be simultaneously extended to the proper distances between the spaced apart water faucets.

FINALLY, YET STILL ANOTHER OBJECT Of the present invention is to provide a water faucet rotation prevention device wherein the maintaining means includes a lock that passes through the lock ring of the open base of the second upper hollow, open base, hemispherical-shaped member of the upper portion and passes through the lock ring of the open base of the second lower hollow, open base, hemispherical-shaped member of the lower portion for maintaining the open base of the first upper hollow, open base, hemispherical-shaped member of the upper portion in contact with the open base of the first lower hollow, open base, hemispherical-shaped member of the lower portion and for maintaining the open base of the second upper hollow, open base, hemispherical-shaped member of the upper portion in contact with the open base of the second lower hollow, open base, hemispherical-shaped member of the lower portion.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

LIST OF REFERENCE NUMERALS UTILIZED IN THE DRAWING 10 water faucet rotation prevention device of the present invention
12 bathtub hot water faucet
13 bathtub hot water faucet stem
14 bathtub cold water faucet
15 bathtub cold water faucet stem
16 child hand
18 child
20 bathtub
22 first upper hollow, open base, hemispherical-shaped member
24 first upper member open base
26 first upper member front semi-circular-shaped throughbore
28 first upper member front throughbore radius of curvature
30 first upper member rear semi-circular-shaped throughbore
31 plurality of first upper member interior sponge inwardly extending pointed protrusions
32 first upper member rear throughbore radius of curvature
33 first upper member interior sponge
34 second upper hollow, open base, hemispherical-shaped member
36 second upper member open base
38 second upper member front semi-circular-shaped throughbore
40 second upper member front throughbore radius of curvature
42 second upper member rear semi-circular-shaped throughbore
44 second upper member rear throughbore radius of curvature
46 second upper member downwardly extending latch prong
47 plurality of second upper member interior sponge inwardly extending pointed protrusions
48 second upper member outwardly extending lock ring
49 second upper member interior sponge
50 upper telescopic, cylindrically-shaped, slender connecting assembly
52 upper connecting assembly hollow sleeve
54 upper connecting assembly rod
55 upper water faucet securing portion
56 first lower hollow, open base, hemispherical-shaped member
58 first lower member open base
60 first lower member front semi-circular-shaped throughbore
62 first lower member front throughbore radius of curvature
64 first lower member rear semi-circular-shaped throughbore
65 plurality of first lower hollow member interior sponge inwardly extending pointed protrusions
66 first lower member rear throughbore radius of curvature
67 first lower member interior sponge
68 hinge
70 second lower hollow, open base, hemispherical-shaped member
72 second lower member open base
74 second lower member front semi-circular-shaped throughbore
76 second lower member front throughbore radius of curvature 77 plurality of second lower member interior sponge inwardly extending pointed protrusions
78 second lower member rear semi-circular-shaped throughbore
79 second lower member interior sponge
80 second lower member rear throughbore radius of curvature
82 second lower member outwardly extending catch ring
84 second lower member outwardly extending lock ring
86 lower telescopic, cylindrically-shaped, slender connecting assembly
88 lower connecting assembly hollow sleeve
90 lower connecting assembly rod
91 lower water faucet securing portion
92 water faucet rotation prevention device open position arrows
94 water faucet rotation prevention device closed position arrows
96 first member continuous spherical internal space
98 first member front continuous circular throughbore
100 first member rear continuous circular throughbore
102 second member continuous spherical internal space
104 second member front continuous circular throughbore
106 second member rear continuous circular throughbore
108 lock

DETAILED DESCRIPTION OF THE PREFERRED EMBODIMENT

Figure 1:
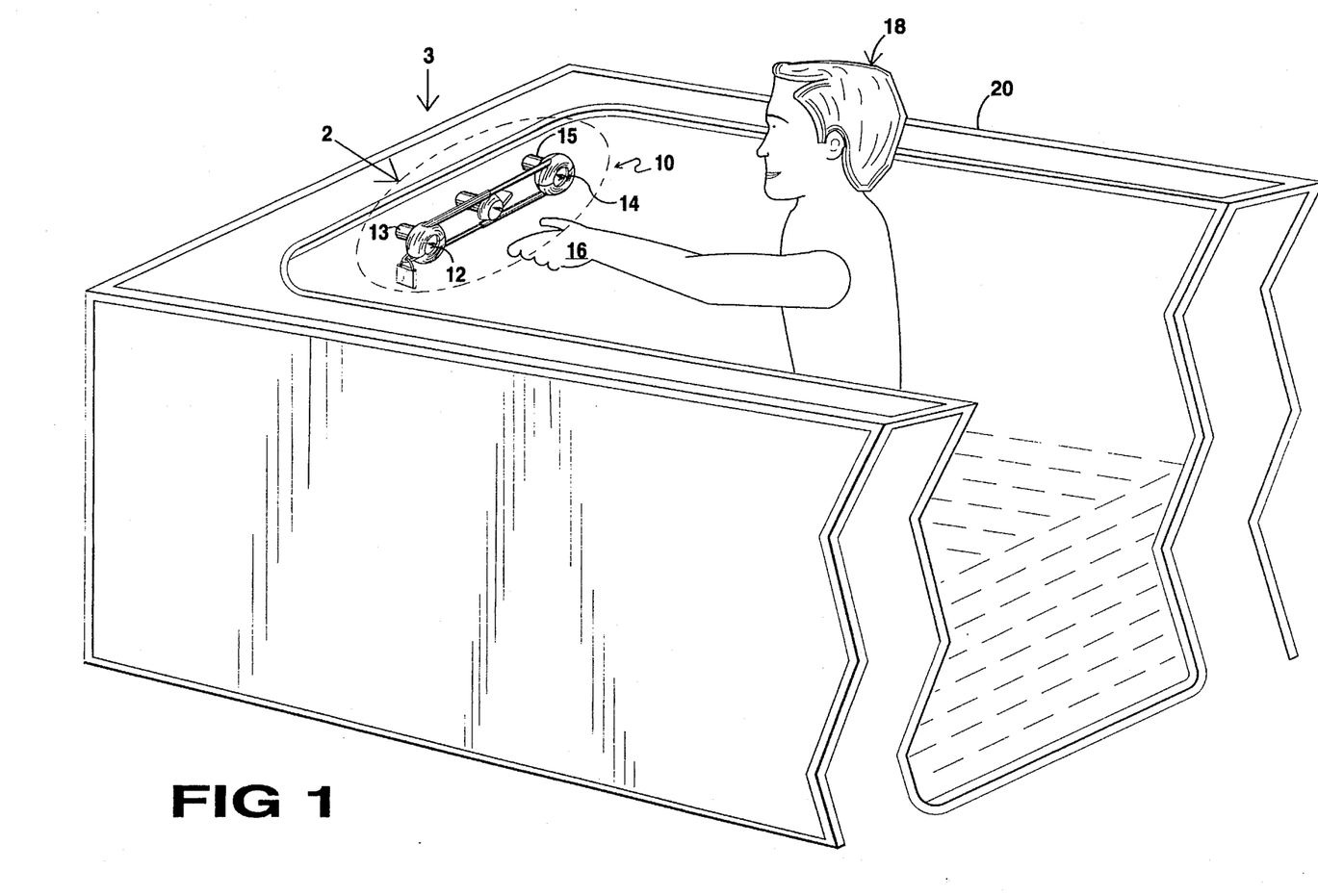
FIG. 1 is a diagrammatic side perspective view illustrating the present invention installed on the faucets of a bathtub and preventing rotation thereof.

Referring now to the figures in which like numerals indicate like parts, and particularly to FIG. 1, the water faucet rotation prevention device of the present invention is shown generally at 10 installed on a bathtub hot water faucet 12 with a bathtub hot water faucet stem 13 and on a bathtub cold water faucet 14 with a bathtub cold water faucet stem 15 and preventing the rotation of the bathtub hot water faucet 12 and the bathtub cold water faucet 14 by a child hand 16 of a child 18 left unattended in a bathtub 20.

The configuration of the water faucet rotation prevention device 10 can best be seen in FIG. 2, and as such will be discussed with reference thereto.

The water faucet rotation prevention device 10 includes a first upper hollow, open base, hemispherical-shaped member 22 that has a first upper member open base 24.

The first upper hollow, open base, hemispherical-shaped member 22 further has a first upper member front semi-circular-shaped throughbore 26 that opens into the first upper member open base 24 of the first upper hollow, open base, hemispherical-shaped member 22 and has a first upper member front throughbore radius of curvature 28.

The first upper hollow, open base, hemispherical-shaped member 22 further has a first upper member rear semi-circular-shaped throughbore 30 that is disposed in opposing alignment with the first upper member front semi-circular-shaped throughbore 26 of the first upper hollow, open base, hemispherical-shaped member 22.

The first upper member rear semi-circular-shaped throughbore 30 of the first upper hollow, open base, hemispherical-shaped member 22 opens into the first upper member open base 24 of the first upper hollow, open base, hemispherical-shaped member 22 and has a first upper member rear throughbore radius of curvature 32 that is less than the first upper member front throughbore radius of curvature 28 of the local first upper member front semi-circular-shaped throughbore 26 of the first upper hollow, open base, hemispherical-shaped member 22.

The first upper hollow, open base, hemispherical-shaped member 22 further has a first upper member interior sponge 33 that covers the entire interior surface of the first upper hollow, open base, hemispherical-shaped member 22. The first upper member interior sponge 33 of the first upper hollow, open base, hemispherical-shaped member 22 has a plurality of first upper member interior sponge inwardly extending pointed protrusions 31 that extend inwardly therefrom.

The water faucet rotation prevention device 10 further includes a second upper hollow, open base, hemispherical-shaped member 34 that is displaced a distance from the first upper hollow, open base, hemispherical-shaped member 22 and has a second upper member open base 36.

The second upper hollow, open base, hemispherical-shaped member 34 further has a second upper member front semi-circular-shaped throughbore 38 that opens into the second upper member open base 36 of the second upper hollow, open base, hemispherical-shaped member 34 and has a second upper member front throughbore radius of curvature 40 that is equal to the first upper member front throughbore radius of curvature 28 of the first upper member front semi-circular-shaped throughbore 26 of the first upper hollow, open base, hemispherical-shaped member 22.

The second upper hollow, open base, hemispherical-shaped member 34 further has a second upper member rear semi-circular-shaped throughbore 42 that is disposed in opposing alignment with the second upper member front semi-circular-shaped throughbore 38 of the second upper hollow, open base, hemispherical-shaped member 34.

The second upper member rear semi-circular-shaped throughbore 42 of the second upper hollow, open base, hemispherical-shaped member 34 opens into the second upper member open base 36 of the second upper hollow, open base, hemispherical-shaped member 34 and has a second upper member rear throughbore radius of curvature 44 that is less than the second upper member front throughbore radius of curvature 40 of the second upper member hemispherical-shaped member front semi-circular-shaped throughbore 38 of the second upper hollow, open base, hemispherical-shaped member 34 and equal to the first upper member rear throughbore radius of curvature 32 of the first upper member rear semi-circular-shaped throughbore 30 of the first upper hollow, open base, hemispherical-shaped member 22.

The second upper hollow, open base, hemispherical-shaped member 34 further has a second upper member downwardly extending latch prong 46 that extends downwardly from the part of the second upper member open base 36 of the second upper hollow, open base, hemispherical-shaped member 34 that faces the first upper hollow, open base, hemispherical-shaped member 22 and is disposed intermediate the second upper member front semi-circular-shaped throughbore 38 of the second upper hollow, open base, hemispherical-shaped member 34 and the second upper member rear semi-circular-shaped throughbore 42 of the second upper hollow, open base, hemispherical-shaped member 34.

The second upper hollow, open base, hemispherical-shaped member 34 further has a second upper member outwardly extending lock ring 48 that extends outwardly from the part of the second member open base 36 of the second upper hollow, open base, hemispherical-shaped member 34 that is opposite to the part of the second upper member open base 36 of the second upper hollow, open base, hemispherical-shaped member 34 on which the second upper member downwardly extending latch prong 46 of the second upper hollow, open base, hemispherical-shaped member 34 is disposed.

The second upper hollow, open base, hemispherical-shaped member 34 further has a second upper member interior sponge 49 that covers the entire interior surface of the second upper hollow, open base, hemispherical-shaped member 34. The second upper member interior sponge 49 of the second upper hollow, open base, hemispherical-shaped member 34 has a plurality of second upper member interior sponge inwardly extending pointed protrusions 47 that extend inwardly therefrom.

The water faucet rotation prevention device 10 further includes an upper telescopic, cylindrically-shaped, slender connecting assembly 50 that has an upper connecting assembly hollow sleeve 52 that extends outwardly from the first upper hollow, open base, hemispherical-shaped member 22.

The upper telescopic, cylindrically-shaped, slender connecting assembly 50 further has an upper connecting assembly rod 54 that extends outwardly from the second upper hollow, open base, hemispherical-shaped member 34 and which is telescopically received by the upper connecting assembly hollow sleeve 52 of the upper telescopic, cylindrically-shaped, slender connecting assembly 50, so that the second upper hollow, open base, hemispherical-shaped member 34 and the first upper hollow, open base, hemispherical-shaped member 22 are extendably connected to each other to be simultaneously extended to the proper distances between the spaced apart water faucets.

The first upper hollow, open base, hemispherical-shaped member 22, the upper telescopic, cylindrically-shaped, slender connecting assembly 50, and the second upper hollow, open base, hemispherical-shaped member 34 together form an upper water faucet securing portion 55.

The water faucet rotation prevention device 10 further includes a first lower hollow, open base, hemispherical-shaped member 56 that has a first lower member open base 58.

The first lower hollow, open base, hemispherical-shaped member 56 further has a first lower member front semi-circular-shaped throughbore 60 that opens into the first lower member open base 58 of the first lower hollow, open base, hemispherical-shaped member 56 and has a first lower member front throughbore radius of curvature 62 that is equal to the first upper member front throughbore radius of curvature 28 of the first upper member front semi-circular-shaped throughbore 26 of the first upper hollow, open base, hemispherical-shaped member 22.

The first lower hollow, open base, hemispherical-shaped member 56 further has a first lower member rear semi-circular-shaped throughbore 64 that is disposed in opposing alignment with the first lower member front semi-circular-shaped throughbore 60 of the first lower hollow, open base, hemispherical-shaped member 34.

The first lower member rear semi-circular-shaped throughbore 64 of the first lower hollow, open base, hemispherical-shaped member 56 opens into the first lower member open base 58 of the first lower hollow, open base, hemispherical-shaped member 56 and has a first lower member rear throughbore radius of curvature 66.

The first lower member rear throughbore radius of curvature 66 of the first lower member rear semi-circular-shaped throughbore 64 of the first lower hollow, open base, hemispherical-shaped member 56 is less than the first lower member front throughbore radius of curvature 62 of the first lower member front semi-circular-shaped throughbore 60 of the first lower hollow, open base, hemispherical-shaped member 56 and is equal to the first upper member rear throughbore radius of curvature 32 of the first upper member rear semi-circular-shaped throughbore 30 of the first upper hollow, open base, hemispherical-shaped member 22.

The first lower hollow, open base, hemispherical-shaped member 56 further has a first lower member interior sponge 67 that covers the entire interior surface of the first lower hollow, open base, hemispherical-shaped member 56. The first lower member interior sponge 67 of the first lower hollow, open base, hemispherical-shaped member 56 has a plurality of first lower hollow member interior sponge inwardly extending pointed protrusions 65 that extend inwardly therefrom.

The first lower hollow, open base, hemispherical-shaped member 56 is hingingly connected to the first upper hollow, open base, hemispherical-shaped member 22 with the first lower member open base 58 of the first lower hollow, open base, hemispherical-shaped member 56 facing the first upper member open base 24 of the first upper hollow, open base, hemispherical-shaped member 22, by a hinge 68.

The hinge 68 connects the outermost part of the first upper member open base 24 of the first upper hollow, open base, hemispherical-shaped member 22, intermediate the first upper member front semi-circular-shaped throughbore 26 of the first upper hollow, open base, hemispherical-shaped member 22 and the first upper member rear semi-circular-shaped throughbore 30 of the first upper hollow, open base, hemispherical-shaped member 22, to the outermost part of the first lower member open base 58 of the first lower hollow, open base, hemispherical-shaped member 56, intermediate the first lower member front semi-circular-shaped throughbore 60 of the first lower hollow, open base, hemispherical-shaped member 56 and the first lower member rear semi-circular-shaped throughbore 64 of the first lower hollow, open base, hemispherical-shaped member 56.

The water faucet rotation prevention device 10 further includes a second lower hollow, open base, hemispherical-shaped member 70 that is displaced a distance from the first lower hollow, open base, hemispherical-shaped member 56 and has a second lower member open base 72.

The second lower hollow, open base, hemispherical-shaped member 70 further has a second lower member front semi-circular-shaped throughbore 74 that opens into the lower member open base 72 of the second lower hollow, open base, hemispherical-shaped member 70 and has a second lower member front throughbore radius of curvature 76 that is equal to the second upper member front throughbore radius of curvature 40 of the second upper member front semi-circular-shaped throughbore 38 of the second upper hollow, open base, hemispherical-shaped member 34.

The second lower hollow, open base, hemispherical-shaped member 70 further has a second lower member rear semi-circular-shaped throughbore 78 that is disposed in opposing alignment with the second lower member front semi-circular-shaped throughbore 74 of the second lower hollow, open base, hemispherical-shaped member 70.

The second lower member rear semi-circular-shaped throughbore 78 of the second lower hollow, open base, hemispherical-shaped member 70 opens into the second lower member open base 72 of the second lower hollow, open base, hemispherical-shaped member 70 and has a second lower member rear throughbore radius of curvature 80.

The second lower member rear throughbore radius of curvature 80 of the second lower member rear semi-circularshaped throughbore 78 of the second lower hollow, open base, hemispherical-shaped member 70 is less than the second lower member front throughbore radius of curvature 76 of the second lower member front semi-circular-shaped throughbore 74 of the second lower hollow, open base, hemispherical-shaped member 70 and equal to the second upper member rear throughbore radius of curvature 44 of the second upper member rear semi-circular-shaped throughbore 42 of the second upper hollow, open base, hemispherical-shaped member 34.

The second lower hollow, open base, hemispherical-shaped member 70 further has a second lower member interior sponge 79 that covers the entire interior surface of the second lower hollow, open base, hemispherical-shaped member 70. The second lower member interior sponge 79 of the second lower hollow, open base, hemispherical-shaped member 70 has a plurality of second lower member interior sponge inwardly extending pointed protrusions 77 that extend inwardly therefrom.

The second lower hollow, open base, hemispherical-shaped member 70 further has a second lower member outwardly extending catch ring 82 that extends outwardly from the part of the second lower member open base 72 of the second lower hollow, open base, hemispherical-shaped member 70 that faces the first lower hollow, open base, hemispherical-shaped member 56.

The second lower member outwardly extending catch ring 82 of the second lower hollow, open base, hemispherical-shaped member 70 is disposed intermediate the second lower member front semi-circular-shaped throughbore 74 of the second lower hollow, open base, hemispherical-shaped member 70 and the second lower member rear semi-circular-shaped throughbore 78 of the second lower hollow, open base, hemispherical-shaped member 70 and is in alignment with the second upper member downwardly extending latch prong 46 of the second upper hollow, open base, hemispherical-shaped member 34.

The second lower hollow, open base, hemispherical-shaped member 70 further has a second lower member outwardly extending lock ring 84 that extends outwardly from the part of the second lower member open base 72 of the second lower hollow, open base, hemispherical-shaped member 70 that is opposite to the part of the second lower member open base 72 of the second lower hollow, open base, hemispherical-shaped member 70 on which the second lower member outwardly extending catch ring 82 of the second lower hollow, open base, hemispherical-shaped member 70 is disposed.

The second lower member outwardly extending lock ring 84 of the second lower hollow, open base, hemispherical-shaped member 70 is disposed intermediate the second lower member front semi-circular-shaped throughbore 74 of the second lower hollow, open base, hemispherical-shaped member 70 and the second lower member rear semi-circular-shaped throughbore 78 of the second lower hollow, open base, hemispherical-shaped member 70 and is in alignment with the second upper member outwardly extending lock ring 48 of the second upper hollow, open base, hemispherical-shaped member 34.

The water faucet rotation prevention device 10 further includes a lower telescopic, cylindrically-shaped, slender connecting assembly 86 that is displaced a distance below the upper telescopic, cylindrically-shaped, slender connecting assembly 50.

The lower telescopic, cylindrically-shaped, slender connecting assembly 86 has a lower connecting assembly hollow sleeve 88 that extends outwardly from the second lower hollow, open base, hemispherical-shaped member 70.

The lower telescopic, cylindrically-shaped, slender connecting assembly 86 further has a lower connecting assembly rod 90 that extends outwardly from the first lower hollow, open base, hemispherical-shaped member 56 and which is telescopically received by the lower connecting assembly hollow sleeve 88 of the lower telescopic, cylindrically-shaped, slender connecting assembly 86, so that the first lower hollow, open base, hemispherical-shaped member 56 and the second lower hollow, open base, hemispherical-shaped member 70 are extendably connected to each other to be simultaneously extended to the proper distances between the spaced apart water faucets.

The first lower hollow, open base, hemispherical-shaped member 56, the lower telescopic, cylindrically-shaped, slender connecting assembly 86, and the second lower hollow, open base, hemispherical-shaped member 70 together form a lower water faucet securing portion 91.

The upper water faucet securing portion 55 is hingingly mounted to the lower water faucet securing portion 91 by the hinge 68 and thereby allowing the water faucet rotation prevention device 10 to achieve an open position and a closed position.

When the water faucet rotation prevention device 10 is achieving the open position, the upper water faucet securing portion 55 and the lower water faucet securing portion 91 pivot away from each other in the direction of water faucet rotation prevention device open position arrows 92 and when the water faucet rotation prevention device 10 is achieving the closed position, the upper water faucet securing portion 55 and the lower water faucet securing portion 91 pivot towards each other in the direction of water faucet rotation prevention device closed position arrows 94.

When the water faucet rotation prevention device is in the closed position: the first upper member open base 24 of the first upper hollow, open base, hemispherical-shaped member 22 meets and opens into the first lower member open base 58 of the first lower hollow, open base, hemispherical-shaped member 56 and together therewith form a first member continuous spherical internal space 96; the first upper member front semi-circular-shaped throughbore 26 of the first upper hollow, open base, hemispherical-shaped member 22 meets and opens into the first lower member front semi-circular-shaped throughbore 60 of the first lower hollow, open base, hemispherical-shaped member 34 and together therewith form a first member front continuous circular throughbore 98 with a diameter; the first upper member rear semi-circular-shaped throughbore 30 of the first upper hollow, open base, hemispherical-shaped member 22 meets and opens into the first lower member rear semi-circular-shaped throughbore 64 of the first lower hollow, open base, hemispherical-shaped member 56 and together therewith forms a first member rear continuous circular throughbore 100 with a diameter that is less than the diameter of the first member front continuous circular throughbore 98; the second upper member open base 36 of the second upper hollow, open base, hemispherical-shaped member 34 meets and opens into the second lower member open base 72 of the second lower hollow, open base, hemispherical-shaped member 70 and together therewith form a second member continuous spherical internal space 102; the second upper member front semi-circular-shaped throughbore 38 of the second upper hollow, open base, hemispherical-shaped member 34 meets and opens into the second lower member front semi-circular-shaped throughbore 74 of the second lower hollow, open base, hemispherical-shaped member 70 and together therewith form a second member front continuous circular throughbore 104 with a diameter that is equal to the diameter of the first member front continuous circular throughbore 98; the second upper member rear semi-circular-shaped throughbore 42 of the second upper hollow, open base, hemispherical-shaped member 34 meets and opens into the second lower member rear semi-circular-shaped throughbore 78 of the second lower hollow, open base, hemispherical-shaped member 70 and together therewith form a second member rear continuous circular throughbore 106 with a diameter that is less than the diameter of the second member front continuous circular throughbore 104 and equal to the diameter of the first member rear continuous circular throughbore 100; the upper telescopic, cylindrically-shaped, slender connecting assembly 50 is substantially parallel to the lower telescopic, cylindrically-shaped, slender connecting assembly 86; the second upper member downwardly extending latch prong 46 of the second upper hollow, open base, hemispherical-shaped member 34 is snapped into the second lower member outwardly extending catch ring 82 of the second lower hollow, open base, hemispherical-shaped member 70; and the second upper member outwardly extending lock ring 48 of the second upper hollow, open base, hemispherical-shaped member 34 meets and is in alignment with the second lower member outwardly extending lock ring 84 of the second lower hollow, open base, hemispherical-shaped member 70 and is maintained therewith by a lock 108 that passes therethrough.

The operation of the water faucet rotation prevention device 10 can best be seen in FIGS. 2 and 3, and as such, will be discussed with reference thereto.

Figure 3:
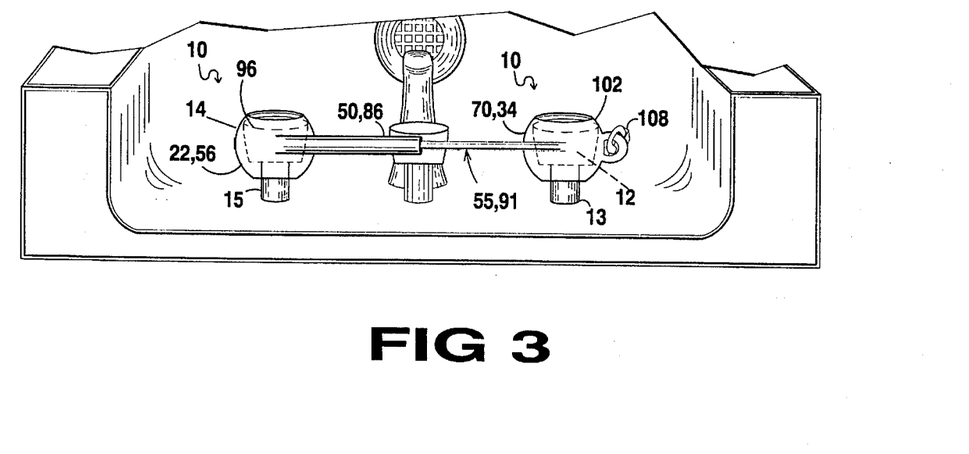
FIG. 3 is a diagrammatic top perspective view taken in the direction of arrow 3 in figure with parts broken away.

As shown in FIG. 3, the upper telescopic, cylindrically-shaped, slender connecting assembly 50 and the lower telescopic, cylindrically-shaped, slender connecting assembly 86 are simultaneously extended to the proper distance between the bathtub cold water faucet 14 and the bathtub hot water faucet 12.

Figure 2:
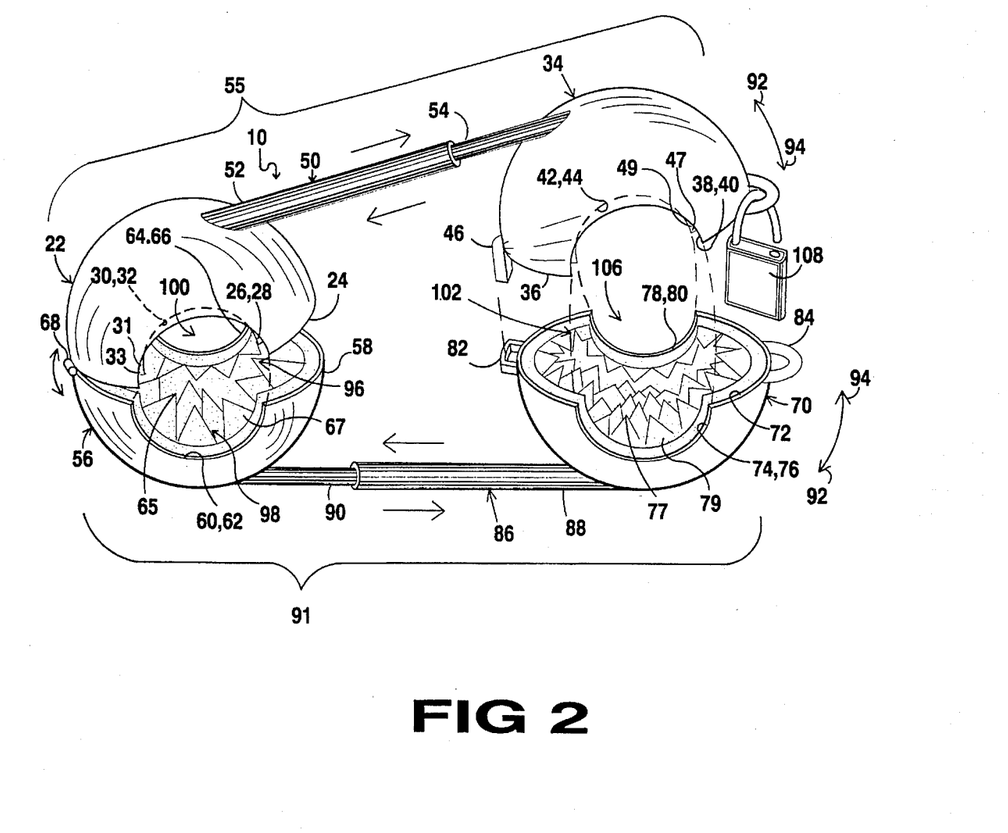
FIG. 2 is a diagrammatic front perspective view of the area enclosed by the dotted ellipse identified by arrow 2 in FIG. 1 of just the present invention in the open position.

As shown in FIG. 2, the lock 108 is opened and the water faucet rotation prevention device 10 is placed in the open position wherein the upper water faucet securing portion 55 is pivoted away from the lower water faucet securing portion 91.

As shown in FIG. 3, the lower water faucet securing portion 91 is positioned under the bathtub cold water faucet 14 and the bathtub hot water faucet 12.

The first lower hollow, open base, hemispherical-shaped member 56 receives the lower portion of the bathtub cold water faucet 14 with the bathtub cold water faucet stem 15 of the bathtub cold water faucet 14 passing through the first lower member front semi-circular-shaped throughbore 60 of the first lower hollow, open base, hemispherical-shaped member 34.

The second lower hollow, open base, hemispherical-shaped member 70 receives the lower portion of the bathtub hot water faucet 12 with the bathtub hot water faucet stem 13 of the bathtub hot water faucet 12 passing through the second lower member front semi-circular-shaped throughbore 74 of the second lower hollow, open base, hemispherical-shaped member 70.

It is to be understood, however, that the first lower member front semi-circular-shaped throughbore 60 of the first lower hollow, open base, hemispherical-shaped member 34 and the second lower member front semi-circular-shaped throughbore 74 of the second lower hollow, open base, hemispherical-shaped member 70 were used because the first lower member rear semi-circular-shaped throughbore 64 of the first lower hollow, open base, hemispherical-shaped member 34 and the second lower member rear semi-circular-shaped throughbore 78 of the second lower hollow, open base, hemispherical-shaped member 70 were too small to accommodate the lower portion of the bathtub hot water faucet stem 13 of the bathtub hot water faucet 12 and the lower portion of the bathtub cold water faucet stem 15 of the bathtub cold water faucet 14.

With this flexibility, the water faucet rotation prevention device 10 can be used with varying sized bathtub water faucets by merely rotating the water faucet rotation prevention device 10 180 degrees about its longitudinal axis.

The upper water faucet securing portion 55 is pivoted downwardly over the bathtub cold water faucet 14 and the bathtub hot water faucet 12.

The first upper hollow, open base, hemispherical-shaped member 22 receives the upper portion of the bathtub cold water faucet 14 with the bathtub cold water faucet stem 15 of the bathtub cold water faucet 14 passing through the first upper member front semi-circular-shaped throughbore 26 of the first upper hollow, open base, hemispherical-shaped member 22.

The second upper hollow, open base, hemispherical-shaped member 34 receives the upper portion of the bathtub hot water faucet 12 with the bathtub hot water faucet stem 13 of the bathtub hot water faucet 12 passing through the second upper member front semi-circular-shaped throughbore 38 of the second upper hollow, open base, hemispherical-shaped member 34.

As the upper water faucet securing portion 55 pivots downwardly and meets the lower water faucet securing portion 91, the second upper member downwardly extending latch prong 46 of the second upper hollow, open base, hemispherical-shaped member 34 snapingly engages the second lower member outwardly extending catch ring 82 of the second lower hollow, open base, hemispherical-shaped member 70 with the bathtub cold water faucet 14 captured in the first member continuous spherical internal space 96 and the bathtub hot water faucet 12 captured in the second member continuous spherical internal space 102.

The lock 108 is closed and the bathtub cold water faucet 14 and the bathtub hot water faucet 12 are maintained unaccessible for unwanted rotation.

It will be understood that each of the elements described above, or two or more together, may also find a useful application in other types of constructions differing from the types described above.

While the invention has been illustrated and described as embodied in a water faucet rotation prevention device, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A water faucet rotation prevention device having an open position and a closed position, comprising:

a) a pair of upper portions for removably receiving a part of a pair of spaced apart water faucets;

b) a pair of lower portions pivotally mounted to said upper portions for removably receiving a remaining part of the pair of spaced apart water faucets, so that when said water faucet rotation prevention device is in said open position the pair of spaced apart water faucets are accessible for rotation and when said water faucet rotation prevention device is in said closed position the pair of spaced apart water faucets are unaccessible for rotation;

c) a pair of extendable connecting means extending between said pair of upper and lower portions for allowing said pair of extendable connecting means to be simultaneously extended to the proper distance between said spaced apart water faucets d) pivoting means for pivotally mounting one of said pair of said upper and lower portions, the other of said pair of upper and lower portions having removably engaging latch means that secures both pairs of the upper and lower portions around said spaced apart faucets in said closed position, wherein when said latch means is disengaged, said pair of extendable connecting means allow both of said upper and lower portions to pivot about said one pair of upper and lower portions and to be removed from said spaced apart faucets to said open position for accessible rotation to said spaced apart faucets; and e) locking means disposed on at least one pair of said upper and lower portions for locking said water faucet rotation prevention device in said closed position, so that the pair of spaced apart water faucets are maintained unaccessible for rotation.

2. The device as defined in claim 1, wherein said upper portion includes a first upper hollow, open base, hemispherical-shaped member that has an interior surface, an open base, a front semi-circular-shaped throughbore that opens into said open base of said first upper hollow, open base, hemispherical-shaped member of said upper portion and has a radius of curvature, and a rear semi-circular-shaped throughbore that is in opposing alignment to said front semi-circular-shaped throughbore of said first upper hollow, open base, hemispherical-shaped member of said upper portion and opens into said open base of said first upper hollow, open base, hemispherical-shaped member of said upper portion and has a radius of curvature.

3. The device as defined in claim 2, wherein said radius of curvature of said rear semi-circular-shaped throughbore of said first upper hollow, open base, hemispherical-shaped member of said upper portion is less than said radius of curvature of said front semi-circular-shaped throughbore of said first upper hollow, open base, hemispherical-shaped member of said upper portion.

4. The device as defined in claim 2, wherein said first upper hollow, open base, hemispherical-shaped member of said upper portion further has an interior sponge covers said interior surface of said first upper hollow, open base, hemispherical-shaped member of said upper portion, said interior sponge of said first upper hollow, open base, hemispherical-shaped member of said upper portion has a plurality of pointed spongy protrusions that extend therefrom.

5. The device as defined in claim 3, wherein said upper portion further includes a second upper hollow, open base, hemispherical-shaped member that is displaced a distance from said first upper hollow, open base, hemispherical-shaped member of said upper portion and has an interior surface, an open base, a front semi-circular-shaped throughbore that opens into said open base of said second upper hollow, open base, hemispherical-shaped member of said upper portion and has a radius of curvature, and a rear semi-circular-shaped throughbore that is in opposing alignment to said front semi-circular-shaped throughbore of said second upper hollow, open base, hemispherical-shaped member of said upper portion and opens into said open base of said second upper hollow, open base, hemispherical-shaped member of said upper portion and has a radius of curvature.

6. The device as defined in claim 5, wherein said radius of curvature of said front semi-circular-shaped throughbore of said second upper hollow, open base, hemispherical-shaped member of said upper portion is equal to said radius of curvature of said front semi-circular-shaped throughbore of said first upper hollow, open base, hemispherical-shaped member of said upper portion, said radius of curvature of said rear semi-circular-shaped throughbore of said second upper hollow, open base, hemispherical-shaped member of said upper portion is less than said radius of curvature of said front semi-circular-shaped throughbore of said second upper hollow, open base, hemispherical-shaped member of said upper portion and equal to said radius of curvature of said rear semi-circular-shaped throughbore of said first upper hollow, open base, hemispherical-shaped member of said upper portion.

7. The device as defined in claim 5, wherein said second upper hollow, open base, hemispherical-shaped member of said upper portion further has a latch prong that extends downwardly from a part of said open base of said second upper hollow, open base, hemispherical-shaped member of said upper portion that faces said first upper hollow, open base, hemispherical-shaped member of said upper portion and is disposed intermediate said front semi-circular-shaped throughbore of said second upper hollow, open base, hemispherical-shaped member of said upper portion and said rear semi-circular-shaped throughbore of said second upper hollow, open base, hemispherical-shaped member of said upper portion.

8. The device as defined in claim 7, wherein said second upper hollow, open base, hemispherical-shaped member of said upper portion further has a lock ring that extends outwardly from a part of said open base of said second upper hollow, open base, hemispherical-shaped member of said upper portion that is opposite to said part of said open base of said second upper hollow, open base, hemispherical-shaped member of said upper portion on which said latch prong of said open base of said second upper hollow, open base, hemispherical-shaped member of said upper portion is disposed.

9. The device as defined in claim 5, wherein said second upper hollow, open base, hemispherical-shaped member of said upper portion further has an interior sponge that covers said interior surface of said second upper hollow, open base, hemispherical-shaped member of said upper portion, said interior sponge of said second upper hollow, open base, hemispherical-shaped member of said upper portion has a plurality of pointed spongy protrusions that extend therefrom.

10. The device as defined in claim 5, wherein said upper portion further includes an upper telescopic, cylindrically-shaped, slender connecting assembly that has a hollow sleeve that extends outwardly from said first upper hollow, open base, hemispherical-shaped member of said upper portion, and a rod that extends outwardly from said second upper hollow, open base, hemispherical-shaped member of said upper portion and which is telescopically received by said hollow sleeve of said upper telescopic, cylindrically-shaped, slender connecting assembly of said upper portion, so that said second upper hollow, open base, hemispherical-shaped member of said upper portion and said first upper hollow, open base, hemispherical-shaped member of said upper portion are extendably connected to each other.

11. The device as defined in claim 8, wherein said lower portion includes a first lower hollow, open base, hemispherical-shaped member that has an interior surface, an open base, a front semi-circular-shaped throughbore that opens into said open base of said first lower hollow, open base, hemispherical-shaped member of said lower portion and has a radius of curvature, and a rear semi-circular-shaped throughbore that is in opposing alignment to said front semi-circular-shaped throughbore of said first lower hollow, open base, hemispherical-shaped member of said-lower portion and has a radius of curvature.

12. The device as defined in claim 11, wherein said radius of curvature of said front semi-circular-shaped throughbore of said first lower hollow, open base, hemispherical-shaped member of said lower portion is equal to said radius of curvature of said front semi-circular-shaped throughbore of said first upper hollow, open base, hemispherical-shaped member of said upper portion, said radius of curvature of said rear semi-circular-shaped throughbore of said first lower hollow, open base, hemispherical-shaped member of said lower portion is less than said radius of curvature of said front semi-circular-shaped throughbore of said first lower hollow, open base, hemispherical-shaped member of said lower portion and is equal to said radius of curvature of said rear semi-circular-shaped throughbore of said first upper hollow, open base, hemispherical-shaped member of said upper portion.

13. The device as defined in claim 11, wherein said first lower hollow, open base, hemispherical-shaped member of said lower portion further has an interior sponge that covers said interior surface of said first lower hollow, open base, hemispherical-shaped member of said lower portion, said interior sponge of said first lower hollow, open base, hemispherical-shaped member of said lower portion has a plurality of pointed spongy protrusions that extend therefrom.

14. The device as defined in claim 11, wherein said pivoting means includes a hinge that hingingly connects said first lower hollow, open base, hemispherical-shaped member of said lower portion to said first upper hollow, open base, hemispherical-shaped member of said upper portion with said open base of said first lower hollow, open base, hemispherical-shaped member of said lower portion facing said open base of said first upper hollow, open base, hemispherical-shaped member of said upper portion, said hinge hingingly connects an outermost part of said open base of said first upper hollow, open base, hemispherical-shaped member of said upper portion, intermediate said front semi-circular-shaped throughbore of said first upper hollow, open base, hemispherical-shaped member of said upper portion and said rear semi-circular-shaped throughbore of said first upper hollow, open base, hemispherical-shaped member of said upper portion, to an outermost part of said open base of said first lower hollow, open base, hemispherical-shaped member of said lower portion, intermediate said front semi-circular-shaped throughbore of said first lower hollow, open base, hemispherical-shaped member of said lower portion and said rear semi-circular-shaped throughbore of said first lower hollow, open base, hemispherical-shaped member of said lower portion.

15. The device as defined in claim 12, wherein said lower portion further includes a second lower hollow, open base, hemispherical-shaped member that is displaced a distance from said first lower hollow, open base, hemispherical-shaped member of said lower portion and has an interior surface, an open base that faces said open base of said second upper hollow, open base, hemispherical-shaped member of said upper portion, a front semi-circular-shaped throughbore that opens into said open base of said second lower hollow, open base, hemispherical-shaped member of said lower portion and has a radius of curvature, and a rear semi-circular-shaped throughbore that is in opposing alignment to said front semi-circular-shaped throughbore of said second lower hollow, open base, hemispherical-shaped member of said lower portion and opens into said open base of said second lower hollow, open base, hemispherical-shaped member of said lower portion and has a radius of curvature.

16. The device as defined in claim 15, wherein said radius of curvature of said front semi-circular-shaped throughbore of said second lower hollow, open base, hemispherical-shaped member of said lower portion is equal to said radius of curvature of said front semi-circular-shaped throughbore of said second upper hollow, open base, hemispherical-shaped member of said upper portion, said radius of curvature of said rear semi-circular-shaped throughbore of said second lower hollow, open base, hemispherical-shaped member of said lower portion is less than said radius of curvature of said front semi-circular-shaped throughbore of said second lower hollow, open base, hemispherical-shaped member of said lower portion and equal to said radius of curvature of said rear semi-circular-shaped throughbore of said second upper hollow, open base, hemispherical-shaped member of said upper portion.

17. The device as defined in claim 15, wherein said second lower hollow, open base, hemispherical-shaped member of said lower portion further has an interior sponge that covers said interior surface of said second lower hollow, open base, hemispherical-shaped member of said lower portion, said interior sponge of said second lower hollow, open base, hemispherical-shaped member of said lower portion has a plurality of pointed spongy protrusions that extend therefrom.

18. The device as defined in claim 12, wherein said second lower hollow, open base, hemispherical-shaped member of said lower portion further has a catch ring that extends outwardly from a part of said open base of said second lower hollow, open base, hemispherical-shaped member of said lower portion that faces said first lower hollow, open base, hemispherical-shaped member of said lower portion, said catch ring of said open base of said second lower hollow, open base, hemispherical-shaped member of said lower portion is disposed intermediate said front semi-circular-shaped throughbore of said second lower hollow, open base, hemispherical-shaped member of said lower portion and said rear semi-circular-shaped throughbore of said second lower hollow, open base, hemispherical-shaped member of said lower portion and is in alignment with said latch prong of said open base of said second upper hollow, open base, hemispherical-shaped member of said upper portion, said second lower hollow, open base, hemispherical-shaped member of said lower portion further has a lock ring that extends outwardly from a part of said open base of said second lower hollow, open base, hemispherical-shaped member of said lower portion that is opposite to said part of said open base of said second lower hollow, open base, hemispherical-shaped member of said lower portion on which said catch ring of said open base of said second lower hollow, open base, hemispherical-shaped member of said lower portion is disposed, said lock ring of said open base of said second lower hollow, open base, hemispherical-shaped member of said lower portion is disposed intermediate said front semi-circular-shaped throughbore of said second lower hollow, open base, hemispherical-shaped member of said lower portion and said rear semi-circular-shaped throughbore of said second lower hollow, open base, hemispherical-shaped member of said lower portion and is in alignment with said lock ring of said open base of said second upper hollow, open base, hemispherical-shaped member of said upper portion.

19. The device as defined in claim 15, wherein said lower portion further includes a lower telescopic, cylindrically-shaped, slender connecting assembly that is displaced a distance below said upper telescopic, cylindrically-shaped, slender connecting assembly, said lower telescopic, cylindrically-shaped, slender connecting assembly has a hollow sleeve that extends outwardly from said second lower hollow, open base, hemispherical-shaped member of said lower portion, and a rod that extends outwardly from said first lower hollow, open base, hemispherical-shaped member of said lower portion and which is telescopically received by said hollow sleeve of said lower telescopic, cylindrically-shaped, slender connecting assembly of said lower portion, so that said first lower hollow, open base, hemispherical-shaped member of said lower portion and said second lower hollow, open base, hemispherical-shaped member of said lower portion are extendably connected to each other.

20. The device as defined in claim 18, wherein said locking means includes a lock that passes through said lock ring of said open base of said second upper hollow, open base, hemispherical-shaped member of said upper portion and passes through said lock ring of said open base of said second lower hollow, open base, hemispherical-shaped member of said lower portion and maintains said open base of said first upper hollow, open base, hemispherical-shaped member of said upper portion in contact with said open base of said first lower hollow, open base, hemispherical-shaped member of said lower portion and for maintaining said open base of said second upper hollow, open base, hemispherical-shaped member of said upper portion in contact with said open base of said second lower hollow, open base, hemispherical-shaped member of said lower portion.

* * * * *